United States Patent [19]

Sabo et al.

[11] Patent Number: 5,110,158
[45] Date of Patent: May 5, 1992

[54] CONNECTOR FITTING LOCKING AND SEALING ARRANGEMENTS

[76] Inventors: Frank J. Sabo, 1230 Meadow View La., Amherst, Ohio 44001-1205; Doonan D. McGaw, 245 Saint James Way, Naples, Fla. 33942-6715

[21] Appl. No.: 463,434

[22] Filed: Jan. 11, 1990

Related U.S. Application Data

[63] Continuation-in-part of Ser. No. 346,473, May 2, 1989, Pat. No. 4,893,846.

[51] Int. Cl.$^5$ .............................................. F16L 55/00
[52] U.S. Cl. ........................................ 285/92; 285/330; 285/159; 285/353; 411/225; 411/226
[58] Field of Search ................. 411/224, 225, 226; 403/320, 356, 357, 358; 285/92, 159, 91, 330, 353, 49

[56] References Cited

U.S. PATENT DOCUMENTS

| 854,260 | 5/1907 | Wooddell | 411/225 |
| 1,005,727 | 10/1911 | Maurice | 411/226 X |
| 1,407,327 | 2/1922 | Giles | 403/320 X |
| 1,539,213 | 5/1925 | Shaw | 411/224 |
| 2,575,582 | 11/1951 | Chamberlain | 403/356 X |
| 4,544,186 | 10/1985 | Proni | 285/322 X |
| 4,893,846 | 1/1990 | McGraw | 285/322 X |

FOREIGN PATENT DOCUMENTS

2542321 4/1976 Fed. Rep. of Germany ...... 403/356

Primary Examiner—Dave W. Arola
Attorney, Agent, or Firm—D. D. McGraw

[57] ABSTRACT

A fitting having members threaded together to a desired position is provided with an arrangement for locking the members against relative rotation so as to maintain the members within a predetermined angular range of rotation relative to each other which encompasses the desired position. The locking arrangement includes longitudinally extending recesses in the outer surfaces of the fitting members which are axially aligned, and an insert which is fitted in a set of axially aligned recesses to lock the members against relative rotation. The recesses are keyhole shaped. The insert is also keyhole shaped in cross section, or is cylindrical. The insert may be made of suitable plastic such as nylon, or may be metallic. When the insert is of a material that is resiliently deformable, it may be laid over and then pressed into the recesses. A metallic or other less deformable insert, such as a rod or wire segment of safety wire, piano wire, etc., may be inserted longitudinally through the set of axially aligned recesses. The insert fills at least the cylindrical portion of the keyhole shaped recesses. When the insert is also keyhole shaped, it may have either parallel or convergent sides along the flat surface portion thereof. Likewise, the keyhole cross section of the recesses may be similarly shaped along the flat portions thereof. The insert is locked in the recesses due to the keyhole shape or the press fitting action of the insert, but may be removed for field service of the fitting. The fitting may also have sealing means, with or without the locking means, protecting the fitting threads against physical damage and contamination.

15 Claims, 2 Drawing Sheets

CONNECTOR FITTING LOCKING AND SEALING ARRANGEMENTS

This application for patent is a continuation-in-part of copending patent application Ser. No. 07/346,473, filed on May 2, 1989, by Doonan Dwight McGraw, one of the co-inventors of the invention herein disclosed and claimed. That application issued on Jan. 16, 1990, as U.S. Pat. No. 4,893,846.

FIELD OF THE INVENTION

The invention relates to connector fittings of the type having a main body and a cap bolt threaded into the main body until it reaches a connector locking position. It also relates to connector fittings having a nut threaded onto the main body for similar purposes. It involves locking arrangements for locking the main body and the cap bolt or the nut against relative rotational movement after the connector is in a locking position. It also involves arrangements for sealing the threads of the type of connector having a nut threaded onto the main body so that the threads are protected from damage and contamination during shipping, handling, installation and use.

BACKGROUND OF THE INVENTION

Connector fittings such as that disclosed and claimed in the above identified copending U.S. Patent Application, now U.S. Pat. No. 4,893,846 issued Jan. 16, 1990, are one type of fitting to which the invention herein disclosed and claimed may be adapted. Another type of fitting is the subject of U.S. Pat. No. 4,544,186-Proni. The locking arrangement of the invention may also be used with connector fittings which are essentially a nut threaded on a bolt so as to be axially immediately adjacent the bolt head, or two or more nuts threaded onto a bolt so that the nuts are axially immediately adjacent each other. While these illustrative constructions to which the invention may be adapted are typically hexagonal in cross section, the invention may also be applied to constructions having other cross section shapes, whether having multiple planar sections or being round, knurled, a combination of such shapes, or constructed in other manners.

All such fittings to which the locking feature of the invention is readily applied have common characteristics in that there are two or more parts which are relatively movable in a rotatable manner about a common axis, and these parts have a desired relatively fixed position which should be maintained during use. Some such fittings utilize self-locking threads, while others do not. In either instance, it is often desirable to lock the parts against such rotation.

Fittings to which the sealing feature of the invention is readily applied have nut portions with internal threads receiving main body portions having external threads, with both types of portions being adapted to receive rods, tubes, pipes or the like devices into or through them so that when the fitting portions are assembled for shipping, as well as when they are being handled, installed and employed in their final usages the internal threads and the external threads are protected against damage and contamination from exterior forces, atmospheres, debris and fluids, for example.

SUMMARY OF THE INVENTION

A fitting having members threaded together to a desired position is provided with an arrangement for locking the members against relative rotation so as to maintain the members within a predetermined angular range of rotation relative to each other which encompasses the desired position. The locking arrangement includes longitudinally extending recesses in the outer surfaces of the fitting members which are axially aligned with the members being within the aforesaid predetermined angular range of rotation relative to each other, and an insert which is fitted in a set of axially aligned recesses to lock the members against relative rotation. The recesses are preferably keyhole shaped. The insert is also keyhole shaped in cross section, or is cylindrical. The insert may be made of suitable plastic such as nylon, or may be metallic. When the insert is of a material that is resiliently deformable, it may be laid over and then pressed into the recesses. A metallic or other less deformable insert, such as a rod or wire segment of safety wire, piano wire, etc., may be inserted longitudinally through the set of axially aligned recesses. The insert fills at least the cylindrical portion of the keyhole shaped recesses. When the insert is also keyhole shaped, it may have either parallel or convergent sides along the flat surface portion thereof. Likewise, the keyhole cross section of the recesses may be similarly shaped along the flat portions thereof. The insert is locked in the recesses due to the keyhole shape or the press fitting action of the insert, but may be removed for field service of the fitting.

More particularly, the fitting is comprised of a main body and one or more cap bolts threaded into one or more ends of the main body, or a main body and one or more nuts threaded onto the main body. While it is to be understood that there may be cap bolts or nuts at either or both ends of an axially extending main body, and the main body may have other shapes as disclosed in the above noted U.S. Pat. No. 4,893,846, further discussion will be in relation to the main body and one such cap bolt head or nut. At times one insert may be used to lock the main body to more than one such cap bolt head or nut. More than one insert may be used when appropriate.

Figures 1, 2, 3, 4, 4A, 5, 6, 7, 8, 9, 10, 11, 12:
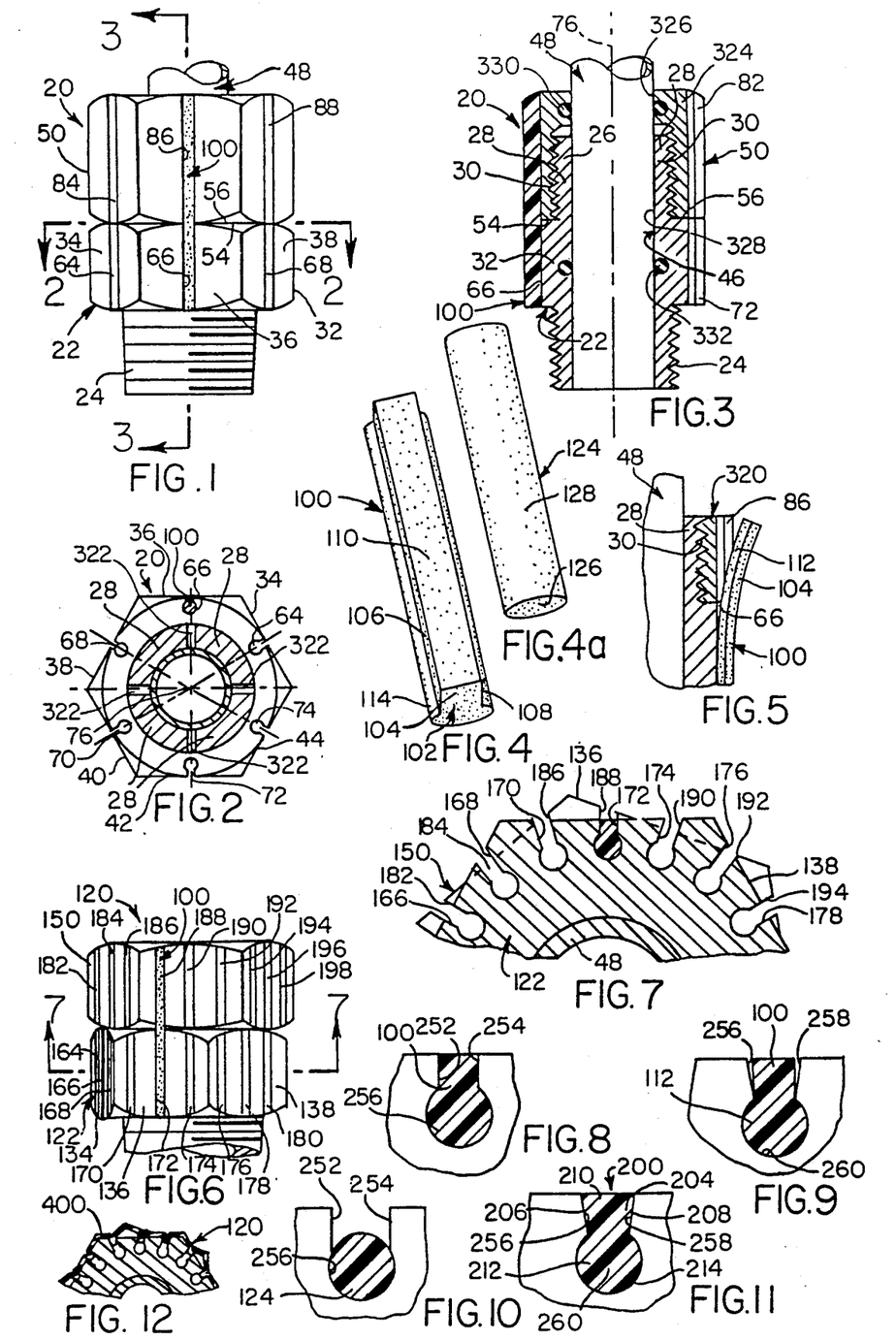
FIG. 1 is an elevation view of a fitting having the sealing feature of the invention and one embodiment of the locking feature of the invention.
FIG. 2 is a transverse cross section view of the fitting of FIG. 1 taken in the direction of arrows 2—2 of that figure.
FIG. 3 is a longitudinal cross section view of the fitting of FIG. 1, taken in the direction of arrows 3—3 of that figure.
FIG. 4 is a perspective view of an insert that may be used in the fitting of FIG. 1.
FIG. 4A is a perspective view of another insert that may be used in the fitting of FIG. 1.
FIG. 5 is a fragmentary cross section view similar to a part of FIG. 3 and showing a flexible insert of the type illustrated in FIG. 4 being pressed in a laying-down manner into an aligned pair of recesses of a fitting similar to that of FIG. 1 but without the thread sealing feature.
FIG. 6 is an elevation view of another fitting similar to the fitting of FIG. 1 and having another embodiment of the invention.
FIG. 7 is a fragmentary transverse cross section view of the fitting of FIG. 6 taken in the direction of arrows 7—7 of that figure.
FIG. 8 is a fragmentary transverse cross section view of one of the recesses in a part of either of the fittings of FIGS. 1 and 6 and showing the parallel-sided insert of FIG. 4 in place in a parallel-sided keyhole shaped recess.
FIG. 9 is similar to FIG. 8, with the parallel-sided insert being in a recess having convergent sides opening into the enlarged portion of the keyhole shape of the recess.
FIG. 10 is similar to FIG. 8, with the insert of FIG. 4A being inserted in the enlarged circular portion of the keyhole recess.
FIG. 11 similar to FIG. 9, with a convergent-sided insert being in a convergent-sided keyhole recess.
FIG. 12 is similar to FIG. 7, with a sleeve of heat-shrunk material having been installed and conforming to the outer surfaces of the nut and main body of the connector fitting.

The main body has an enlarged portion which is exteriorly shaped like the exterior of the cap bolt head or the nut. The most common shape is that of a hexagon, but other shapes may be used, including a circular, square or octagonal shape, etc. The main body and the cap bolt head or the nut threadedly fitted to the main body are provided with multiple sets of circumferentially spaced axially alignable recesses in their outer surfaces in which may be received one, and if desired, two or more, inserts. One such insert fits within two axially aligned recesses when the main body and the cap bolt head or the nut are in the desired relative position, preventing one from rotating relative to the other so long as the insert is in place. The typical desired relative position is one in which the two relatively rotatable parts are tightened by threading action to a desired position. There may be any reasonable number of recesses in the outer surface of a particular part. Because the connector fittings of the types disclosed in the above identified patents are disclosed as having hexagonal surfaces, there may be one to three recesses in each hexagonal plane for a total of six, twelve or eighteen recesses in one part. While at times more than three recesses may be in a hexagonal plane, it has been found to be practical to use no more than three. The centerlines of the recesses, as seen in cross section, must be on radii of the part so that a recess in one part can be properly aligned with a recess in the adjacent part. When one recess is used in each hexagonal plane of both parts, two recesses may be aligned with each sixty degree increment of relative rotational movement. When two or three recesses are used in each hexagonal plane, two recesses may be aligned with each thirty or fifteen degree increment of relative rotational movement. Thus the two recessed parts can always be locked in position within thirty, fifteen, or seven and one-half degrees of the exact desired position. To obtain this accuracy, it is only necessary that one of the recessed parts have recesses in all hexagonal planes. The recesses of FIGS. 8 and 10, described above as having straight, parallel side walls 252 and 254, are illustrated in the drawings as defining rectangular cross section portions of the recesses of those figures. The recesses of FIGS. 9 and 11 are described above as having convergent side walls 256 and 258 defining trapezoidal cross section portions of the recesses. They are so illustrated in the drawings. Since both rectangles and trapezoids are quadrangles, these recess portions are therefore quadrangular cross section portions of the recesses illustrated in FIGS. 7-11. Likewise, the insert 100 of FIGS. 4, 8 and 9 and the insert 200 of FIG. 11, also having rectangular cross section or trapezoidal cross section portions, are properly described as having quadrangular cross section portions. However, it is easier in many installations to have such recesses in all hexagonal planes of all cooperating recessed parts so that one pair of recesses can be readily accessible. When the recessed parts have different shapes, different numbers of recesses may be provided as necessary to obtain the desired accuracy of position in which the parts are locked. If the parts are round, any appropriate number of recesses may be used, so long as the parts are able to maintain their strength and function.

The recesses may have several different cross-sectional shapes, including U-shaped, round with a portion of the side wall removed where an arc of the round portion passes through the outer surface of the part to provide an access opening, and key-hole. The key-hole may be one with parallel sides opening into the enlarged part, or convergent sides opening into the enlarged part.

The insert is preferably made of a material that is deformable to a sufficient extent to be pushed into the aligned recesses for a tight fit. Nylon has been found to be a satisfactory material, by way of example. It is preferred that the insert and the recesses be so matched that the insert can be laid into the recesses from the outer surfaces of the parts by pushing it radially inward. In some instances it may be desirable to start one end of the insert in one end of one recess and force the insert axially through the aligned recesses until it is contained in the recesses. The method of assembly depends in part on the resiliency and deformability of the material of the insert, as well as the material of the recessed parts. If the insert is a circular wire, it is preferably a ductile wire in most instances. Similar wire material has been used for the safety wiring of a series of bolts, for example, for many years, particularly on critical installations such a aircraft engines. The wire is inserted through holes extending transversely through the various bolt heads on a bolt circle, and twisted to hold it in place.

In other instances the wire may be of stainless steel or piano wire. Wire of this type will usually have to be inserted axially through the recesses, but it is desirable when possible to be able to push the wire by laying it into the recesses from the outer surfaces of the parts by pushing it radially inward. By careful sizing of the recesses and the wire, a resilient spring-lock effect can be obtained. The insert may be of a relatively hard but resilient plastic material. It may also be wire-like. One commonly available source of such material is the same monofilament used in many hand-held power weed-cutting machines. It is available in various size diameters, can be purchased in long lengths on reels, may be cut to length from the reel for field use, and is readily adapted to being laid into the recesses and pushed radially inward.

Other insert shapes which are preferred have a keyhole shaped cross section, either with parallel sides or convergent sides. Either type may be used in the convergent sided keyhole shaped recesses earlier described.

It is desirable that the inserts be removable by a small hand tool by inserting the tool in one end of the recess and either pushing or lifting the insert at least part way out of the recesses. When lifting the insert out, it is much like a peeling operation. If the tool cannot completely remove the insert, it can at least move one insert end far enough out of one recess, either axially or radially, so as to be able to complete the removal by use of a gripping tool such as pliers. This ability to remove the insert is important in field operations when the fitting has to be removed. Usually a new insert is used when the fitting has been retightened.

The sealing feature of the invention may be used in conjunction with the locking feature as illustrated in the drawing, or may be used independently of that feature. It is applicable to the type of fitting disclosed and claimed in the U.S. Pat. No. 4,544,186-Proni, in which the fitting main body has external threads on which a nut is fitted. That patent discloses an substantially standard hex nut with internal threads receiving the externally threaded portion of the main body which is segmented for locking purposes. Even if the nut is in place during shipping and handling, the threads are open to the atmosphere at the outer end of the externally threaded portion of the main body and the internally threaded portion of the nut so that corrosive substances can enter and damage the threads. This arrangement also renders the threads in that area more susceptible to accidental physical damage, possibly deforming them and making the connector very difficult to disconnect, and usually requiring new connector portions to be used because of the damage. The sealing feature of the invention obviates these problems, in shipping as well as in use.

A modification of the above-described sealing feature may include an arrangement in which the nut and the main body each have one or more recesses as above described, including simpler U-, V-, or channel cross-section shapes, which are not necessarily aligned after the nut is tightened in place. Instead of recesses, knurled areas on the outer surfaces of the nut and main body may be provided. A sleeve of plastic heat-shrinkable material which also becomes harder when heat is applied, the internal diameter of the sleeve before being heat shrunk being slightly greater than the maximum diameter of the fitting, is positioned over the tube or rod before the fitting receives the tube or rod, and is then moved axially so that it is located over the fitting after it is tightened. Heat, such as warm air from a portable heater somewhat like a blow dryer for hair, is directed over the plastic heat-shrinkable material. This causes the material to shrink to a tight fit around the fitting nut and main body, with portions overlying the recesses and corners of the typical hexagonal configuration shown in the drawing fitting the recesses and corners tightly so as to conform to them, locking the fitting parts against relative rotation. The portions of the sleeve tending to conform to the recesses function to grip the nut and the main body, and act much like inserts which are connected together circumferentially. The sleeve will also provide a very effective seal for the juncture of the nut and the main body surfaces. When extended axially to a sufficient extent, if will also shrink over the tube or rod and effectively seal the axially outer ends of the internal and external threads. Some heat-shrinkable materials may be provided as tape or strips which are wrapped around the desired parts of the fitting for several turns, with appropriate heat then being applied to shrink the plastic material and cause the material to tighten upon itself and grip the nut and main body. The plastic material may or may not tend to be fuzed when heated.

The sleeve can be readily removed by cutting or tearing it, using a knife for the cutting and at least the start of the tearing action. In the field, another sleeve would be used after repairs have been made. At times, both a sleeve and one or more of the earlier-described inserts may be used.

Sleeves of such material are already known and used in conjunction with electrical terminals which are clamped on wires, by way of example. Such material is also commonly used in encapsulating individual parts or groups of parts to form packages for the retail trade. However, there is not known to be any recognition of using such material to prevent two or more relatively rotatable parts from moving rotatably while the parts are installed and are performing their designed functions.

DETAILED DESCRIPTION

The fitting 20 of FIGS. 1, 2, 3 and 5 has a main body 22 provided with a pipe threaded end 24 adapted to be threaded into a typical pipe or the wall of a container, by way of example. The other end 26 of the main body 22 has several fingers 28 which have external threads 30. The center portion 32 of the main body is illustrated as being hexagonally shaped, having an outer surface formed as planes 34, 36, 38, 40, 42 and 44. The main body has a bore 46 extending therethrough. The fitting 20 is arranged to receive a tube 48 through the bore 46 so as to have the fitting fastened thereto. The fitting 20 also includes an internally threaded nut 50 which is threaded over the external threads 30 of fingers 28. Nut 50 has the sealing feature of the invention incorporated therein, which feature will be described separately after the description of the locking feature of the invention is completed. With the tube 48 in place, the nut 50 is tightened until its one end surface 54 engages the abutting flange 56 of the main body center portion 32. Further tightening causes the fingers to be forced into gripping relation with the tube as disclosed in the above noted patent U.S. Pat. No. 4,544,186-Proni, by way of example. When the nut 50 is sufficiently tightened, the tube is securely connected to the fitting.

Once such a fitting is tightened to the desired position, it is sometimes desirable to lock the two parts, that is, the main body 22 and the nut 50, against relative rotation so that they do not become loosened. This is particularly important when the tube and the fitting are subject to vibrations during use. For this reason, the arrangement embodying the invention is employed.

The fitting 20 as particularly illustrated in FIGS. 1 and 2 has a recess in each of the outer surface planes of the hexagonal body center portion 32, and the nut 50 is similarly constructed. As better seen in FIG. 2, the main body center portion 32 has one recess in the center of each outer surface plane. Therefore recess 64 is in plane 34, recess 66 is in plane 36, recess 68 is in plane 38, recess 70 is in plane 40, recess 72 is in plane 42, and recess 74 is in plane 44. Each recess has its cross section plane as seen in FIG. 2 with its centerline lying on a radius extending from the common axis 76 of main body 22 and nut 50. Nut 50 is provided with similar recesses, of which recesses 82, 84, 86 and 88 can be seen in one or more of FIGS. 1–3. All of the recesses extend axially parallel to the common axis 76. As earlier noted, the recesses may have cross section shapes other than the keyhole shapes shown, but the keyhole shapes are preferred because of their versatility, as will be described.

The insert 100 of FIG. 4 has a keyhole shaped cross section as seen by its end surface 102, with a rectangular cross section portion 104 having parallel side surfaces 106 and 108 and a top surface 110. It also has a circular cross section portion 112 joined with the rectangular cross section portion 104 to define the keyhole shaped cross section. The circular cross section portion 112 has a cylindrical outer surface 114.

The insert 124 of FIG. 4A is circular, and may be a segment of a wire rod or a monofilament strand. It is illustrated as being a wire rod. It has a circular cross section as seen by its end surface 126, and a cylindrical outer surface 128.

The fitting 120 of FIGS. 6 and 7 is a modification of the fitting of FIGS. 1, 2, 3 and 5 in that it has three recesses in each hexagon outer surface plane of the main body 122 and the nut 150. Thus, of the parts in view in FIGS. 6 and 7, the main body plane 134 has recesses 164, 166 and 168; the main body plane 136 has recesses 170, 172 and 174, and the main body plane 138 has recesses 176, 178 and 180. The other three planes not seen are similarly provided with such recesses. Similarly, the nut planes have similar recesses, with recesses 182, 184, 186, 188, 190, 192, 194, 196 and 198 being shown. Any one of the recesses of the main body 122 may be axially aligned with any one of the recesses of the nut 150.

The main body planes do not have to be aligned with the nut planes for this to occur as in the case of fitting 22. This is shown in FIG. 7, in which the nut 150 has its planes at an angle of 20° from the planes of main body 122 most nearly aligned with them. For this reason, a plane center recess 190 of nut 150 is aligned with a plane side recess 174 of main body 122. An insert 100 is inserted into recesses 174 and 190, locking the main body 122 and the nut 150 against relative rotation. It is understood that insert 100 could have been inserted into any one set of the aligned recesses of the main body 122 and the nut 150. At times it may be desirable to use more than one insert, which can be readily done by choosing more than one aligned set of recesses and placing inserts in them. Since in this instance the recesses are spaced 20° apart, the nut can always be within 10° of any desired position when it is locked against rotation on the main body.

The insert to be used may have any of several cross section shapes, three of which are illustrated in the drawing. The inserts 100 and 124 shown in FIGS. 4 and 4a may be used in any of the various keyhole shaped recesses shown, as well as in recesses somewhat like that of FIG. 8 which have been modified so that they have little or no flat side wall portions, but are essentially only the circular portion of the recess, with the part normally connected to the flat side wall portion opening through the outer surface of the fitting portion. The insert 200 shown in FIG. 11 may usually be used only in the convergent wall recess of the type shown in FIGS. 9 and 11. Insert 200 has a keyhole shaped cross section, with a trapezoidal cross section portion 204 having convergent side surfaces 206 and 208 and a top surface 210. It also has a circular cross section portion 212 joined with the rectangular cross section portion 202 to define the keyhole shaped cross section. The circular cross section portion 212 has a cylindrical outer surface 214.

FIGS. 8 and 10 show the typical keyhole recess with straight side walls 252 and 254 which are parallel, and the cylindrical lower portion 256. An insert such as insert 100 of FIG. 4 is inserted in the recess of FIG. 8. The insert is preferably of a hard but resilient plastic which can be forced into position in the aligned recesses in the manner shown in FIG. 5. After it is in position it locks itself against unintentional removal due to the somewhat larger cross dimension of the cylindrical cross section portion 112 and its relationship to the relatively narrower cross dimension between the recess side walls 252 and 254.

In FIG. 10, an insert such as the insert 124 of FIG. 4A is shown as being inserted in the cylindrical lower portion 256 of the recess. It may be inserted axially of the aligned recesses if the insert is made of a material which is not resiliently deformable to the extent needed to install it in the manner shown in FIG. 5. If the insert is resiliently deformable to the needed extent, it may be pressed into position in the recesses in the manner illustrated in FIG. 5.

FIGS. 9 and 11 show the trapezoidal keyhole recess with convergent side walls 256 and 258 and the cylindrical lower portion 260 which is somewhat larger in diameter than the width between the convergent side walls where they join the cylindrical lower portion. This difference in those dimensions may be slight, as they may also be in the recesses of FIGS. 1–3, 5–8 and 10. When an insert 100 is inserted in the recess of FIG. 9 in the manner illustrated in FIG. 5, its cylindrical lower section 112 is guided and compressed and deformed by the convergent side walls until it is fully received in the cylindrical lower portion 260. That is the position shown in FIG. 9. When the insert 200 is inserted in the recess, as shown in FIG. 11, its trapezoidal portion fills the mating trapezoidal portion of the recess. Like the insert 100 filling the mating rectangular flat wall portion of the recess of FIG. 8, it keeps the recess better sealed against the collection of foreign debris than do the arrangements of FIGS. 9 and 10. This can be minimized in FIG. 10 by moving the cylindrical portion radially outward from the position shown so that the recess side walls 252 and 254 are substantially or completely eliminated. An arcuate portion of the cylindrical portion 256, the chord of which is less than the diameter of the cylindrical portion 256, would then be open through the outer surface of the nut and main body.

The sealing feature of the invention will now be described in detail. FIGS. 1 and 3, and FIGS. 2 and 5 are of particular interest in that the first two of those Figures show the sealing feature of the invention, while FIGS. 2 and 5 shows the construction which, when the plain nut of FIG. 5 is used, exposes the threads to corrosion and possible physical damage. FIG. 2 is of interest in that it shows the slots forming the fingers 28. For the FIG. 5 arrangement, the plain nut is like the nut shown in U.S. Pat. No. 4,544,186 noted above. These slots are also open through the nut so that debris and corrosive material can become lodged therein and damage the threads either during shipping, storage or in use. This is particularly important when such a fitting is being used on the underside of a vehicle, for example, where it is exposed to many contaminants, including heavy salt concentrations during winter in many parts of the world. Salt or other corrosive material can cause the threads to deteriorate so that the fittings cannot be readily removed, and when so removed they must be replaced due to the damage to the threads.

As is better seen in FIG. 5, the nut 320, like the nut 120 of FIG. 6, fits over the external threads 30 formed on the fingers 28, and terminates at or near the ends of those fingers. Thus the internal threads of the nut and the external threads 30 of the fingers 28 of the main body 22 are exposed to damage and corrosion at these ends. Also, since the slots 322, shown in FIG. 2 and forming the externally threaded fingers 28 from an annular part of the main body 22, extend to the outer ends of those fingers, as also disclosed in the Proni patent noted above, contaminants can enter through the slots and damage the internal threads of the nut where they are exposed to the slots, as well as contacting the threaded edges of the fingers at the slot sides and corroding them as well.

By extending one end 324 of the nut 20 so that its internally threaded axial length is greater than the axial length of the fingers 28 from the surface 56 of the main body 22, and then forming nut end 324 as a reduced diameter portion with its internal surface 326 being of the same diameter as the internal surface 328 of the main body bore 44, and placing a seal such as the O-ring seal 330 in a groove formed in the nut internal surface 326, the nut provides a closure around the finger external threads from the contact areas 54 and 56 to a short distance beyond the ends of the fingers, and also encloses the internal threads of the nut. When the tube 48 is inserted in the fitting as best shown in FIGS. 2, 3 and 5, it is sealed by the O-ring seal 330 of the nut reduced diameter end 324 as well as by the O-ring seal 332 in a groove formed in the inner side wall 328 defining the main body bore 44. Thus contaminants are effectively prevented from entering the fitting so as to damage the internal and external threads of the main body fingers and the nut, as well as protecting them from physical damage during shipping and handling. As disclosed in the above noted U.S. Pat. No. 4,893,846, suitable shipping plugs may be inserted in the ends of the fitting to prevent contamination of the bore 44, the seals 330 and 332 and the threads of the nut and the fingers. Such shipping plugs may be of plastic, for example, or may be short pieces of a pipe of the same outer diameter size as pipe 48. Pipe caps, which are similar to plastic shipping plugs, and made of the same material as pipe 48, may be used to plug the ends of the fitting if desired. As in the above noted U.S. Pat. No. 4,893,846, the nut 20 may be threaded onto the fingers 28 and lightly tightened so that it remains in place during shipping and handling, and need not be removed to insert the tube 48 into the fitting.

While the sealing feature of the invention is illustrated with a fitting having a pipe thread on one end, it is also usable with other types of fittings such as those disclosed in U.S. Pat. No. 4,544,186-Proni and the other noted art, such as double-ended fittings, elbows, tees, etc. In each instance in which a nut is threaded on externally threaded fingers as shown in U.S. Pat. No. 4,544,186-Proni, the sealing feature of the invention will fully protect the threads.

Figure 13:
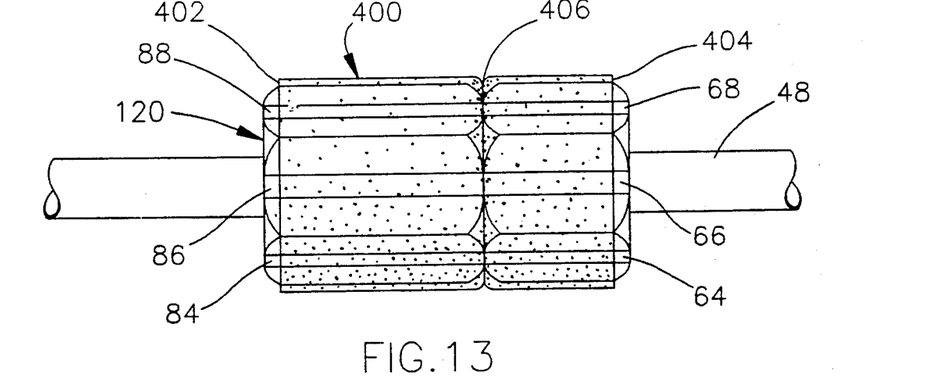
FIG. 13 relates to FIG. 12, and is an elevation view of a connector fitting having a nut and main body such as that shown in U.S. Pat. No. 4,893,846. It shows the heat-shrunk material having been installed over the fitting intermediate the fitting outer ends and conforming to the outer surfaces of the fitting.
Figure 14:
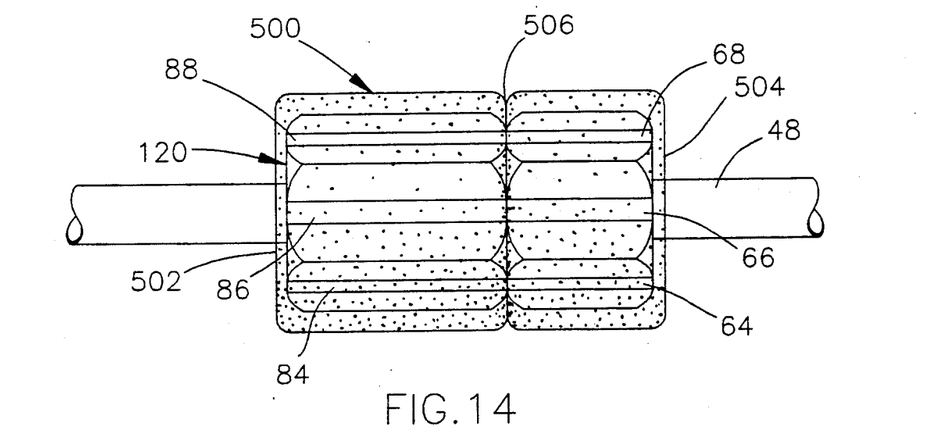
FIG. 14 is similar to FIG. 13, with the heat-shrunk material having been installed over the fitting and sufficiently beyond the fitting outer ends so that when it is heat-shrunk it conforms to the outer surfaces of the fitting and portions of the outer end surfaces of the fitting.
Figure 15:
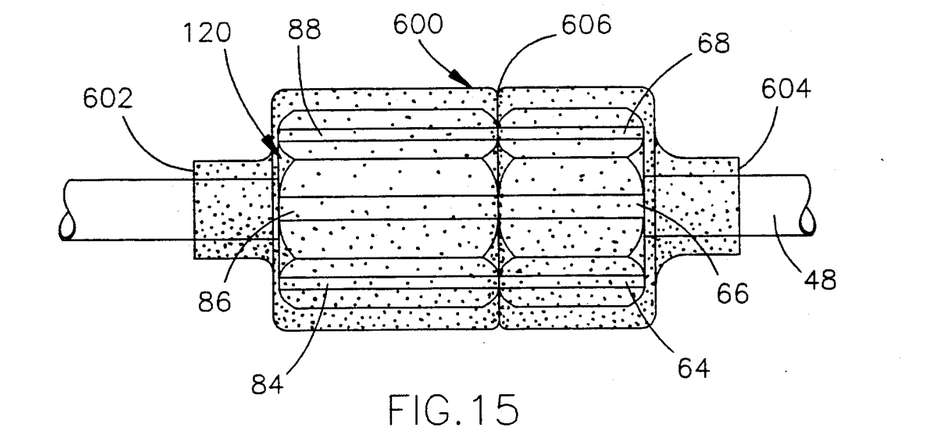
FIG. 15 is similar to FIGS. 13 and 14, with the heat-shrunk material having been installed over the fitting and sufficiently beyond the fitting outer ends so that it covers in sealing relation the entire fitting and adjacent exposed portions of the outer surfaces of the tube sections extending therefrom, conforming to the outer surface and outer ends of the fitting and the outer surfaces of the adjacent exposed portions of the tube sections extending from the fitting.

The sealing arrangement of FIG. 12 is illustrated as being applied to the connector fitting 120 of FIGS. 6 and 7, and in FIGS. 13-15 is illustrated as being applied to the connector fitting of U.S. Pat. No. 4,893,846. It is to be understood that it may be applied to other connector fittings disclosed herein as well as those disclosed in the above identified patents and patent application.

FIGS. 13-15 relate to FIG. 12. They show the heat-shrunk material installed on a fitting 120 of the type disclosed in U.S. Pat. No. 4,893,846. The fitting has a tube section 48 extending from one end of the fitting, and is illustrated as having a similar tube section extending from the other end of the fitting. The fitting has recesses 64, 66, 68 and 84, 86 and 88 as found in the fitting of FIG. 1.

As specifically shown in FIG. 13, the ends 402 and 404 of the heat-shrunk material 400 are positioned intermediate the outer ends of the fitting, and the center portion 406 has shrunk into the recess between the two parts of the fitting 120. In doing so, it extends into the adjacent ends of recesses 64 and 84, 66 and 86, and 68 and 88, locking the two parts of the fitting against relative rotation. It also circumferentially surrounds the adjacent fitting members at adjacent portions of the sets of angularly related adjacent surfaces forming outer surfaces of each of the fitting members, gripping those sets of angularly related adjacent surfaces in locking and sealing relation.

As specifically shown in FIG. 13, the ends 502 and 504 of the heat-shrunk material 500 are positioned sufficiently beyond the fitting outer ends so that when it is heat-shrunk it conforms to the outer surfaces of the fitting and portions of the outer end surfaces of the fitting. This embodiment has the features of the one in FIG. 13, including the recessed portion 506, but also covers the outer ends of the recesses 64, 66, 68, 84, 86 and 88, extending into them as the heat-shrunk material wraps around the areas where the fitting outer surfaces and end surfaces join.

As specifically shown in FIG. 15, the embodiment is similar to those of FIGS. 13 and 14, with the heat-shrunk material 600 having been installed over the fitting and sufficiently beyond the fitting outer ends so that it covers in sealing relation the entire fitting and adjacent exposed portions of the outer surfaces of the tube sections 48 extending therefrom, conforming to the outer surface and outer ends of the fitting and the outer surfaces of the adjacent exposed portions of the tube sections extending from the fitting. It also has the sealing and locking features shown in FIG. 14. In this arrangement it seals the entire fitting installation.

When the heat-shrinkable plastic material 400, 500 or 600 is used it not only shapes itself, when heated, so as to prevent unintentional relative rotation of the nut and the main body, but also seals them in the area of their abutting surfaces 54 and 56, shrinking at 406, 506 or 606 into the generally annular recess formed by the adjacent beveled ends of the nut 122 and main body 150. This recess is clearly shown in FIG. 6. The heat shrink material also shrinks into at least the adjacent end portions of the longitudinal recesses as shown in FIGS. 13-15. When extended longitudinally a sufficient length, such a sleeve shrinks into the opposite end portions of the longitudinal recesses as well, as shown in FIGS. 14 and 15. When it shrinks into one or both of these recess end portions, it forms the equivalent of inserts which are within recesses, or at least parts of them, formed in both the nut and the main body. When extended axially beyond the fitting, it also seals the outer end of the fitting and the tube or rod within the fitting as shown in FIG. 15. The amount of shrink material used must be determined, based on the amount of fitting coverage desired and the percentage shrinkage of the material. Materials which when heated may shrink about 40% to 60%, by way of example.

Heat shrink material is commercially available, as are various devices such as heat guns for applying heat to the material. It is usually used in packaging arrangements, substituting for bagging, boxes and strapping materials in which parts, or even pallets of parts, are being shipped. It may be obtained in sheets, strips, rolls, bags, and tubes, for example. There is not known to be any teaching of using heat shrink materials to hold two or more relatively rotatable threaded parts against relative rotation while the part is installed and in use, and especially over a protracted period of time. In the past, it has been a shipping package only, a container for the entire item or group of items, the container being for temporary use which is removed when the part or parts are to be installed in their final employment positions.

We claim:

1. In a fitting having a first threaded member and a second threaded member joined in axially aligned threaded relation with said first member to a desired arcuate position relative to said first member, said members each having an axially extending part thereof which is diametrically greater than the mating threads of either of said members, said diametrically greater axially extending parts being axially juxtaposed when said members are in said desired arcuate position; the improvement including locking arrangement means for removably locking said first and second members against relative arcuate threading movements at a relative arcuate position of said members which is within a predetermined arcuate degree range of said desired arcuate position, said locking arrangement means comprising:

at least one longitudinally extending first recess formed in said outer surface of said first threaded member and a plurality of circumferentially spaced second recesses formed in said outer surface of said second threaded member, said recesses being defined by radially extending wall surfaces, at least portions of said radially extending wall surfaces being laterally spaced from other portions thereof, said first and second recesses having in cross section at least portions thereof by which said at least one first recess is selectively longitudinally alignable with at least one of said second recesses in increments of relative arcuate movements of said first and second members to define at least one alignment set of recesses formed by one of said at least one first recesses and one of said second recesses so that at least one such selected longitudinal alignment set is attained within said predetermined arcuate degree range of said desired arcuate position;

and insert means inserted into said at least one such selected longitudinal alignment set of recesses and having at least one wall surface engaging at least one of said radially extending recess wall surfaces between said laterally spaced portions thereof, said insert means and said first and second recesses of said at least one such selected longitudinal alignment set of recesses having means including said engaged wall surfaces cooperating to secure said insert means in said at least one such selected longitudinal alignment set of recesses, locking said insert means against radial removal from said at least one such selected longitudinal alignment set of recesses and resisting longitudinal removal of said insert means from said at least one such selected longitudinal alignment set of recesses, said insert means preventing relative arcuate movements of said first member and said second member, said insert means being removable from said at least one such selected longitudinal alignment set of recesses so that said first and second members may be arcuately moved in cooperative threaded relation relative to each other.

2. The locking arrangement means of claim 1 in which said wall surfaces of said first and second recesses define matable circular cross section recess portions and non-circular cross section recess portions, said non-circular cross section recess portions being positioned radially outward of said circular cross section recess portions and having a minimum cross section width which is less than the diameter defining the cross section width of said circular cross section recess portions, and said insert means has at least a part thereof which is circular in cross section and at least radially fills said matable circular cross section recess portions of said at least one such selected longitudinal alignment set of recesses.

3. The locking arrangement means of claim 2 in which said insert means is laterally press fitted into said at least one such selected longitudinal alignment set of recesses.

4. In a fitting having a first threaded member and a second threaded member joined in axially aligned threaded relation with said first member to a desired arcuate position relative to said first member, said members each having an axially extending part thereof which is diametrically greater than the mating threads of either of said members, said diametrically greater axially extending parts being axially juxtaposed when said members are in said desired arcuate position; the improvement including locking arrangement means for removably locking said first and second members against relative arcuate movements at a relative arcuate position of said members which is within a predetermined arcuate degree range of said desired arcuate position, said locking arrangement means comprising:

at least one longitudinally extending first recess formed in said outer surface of said first threaded member and a plurality of circumferentially spaced second recesses formed in said outer surface of said second threaded member, said recesses having matable keyhole shaped cross sections each of which is defined by a quadrangular cross section outer portion connecting with a radially inner circular portion, said first and second recesses having in cross section at least portions thereof by which said at least one first recess is selectively longitudinally alignable with at least one of said second recesses in increments of relative arcuate movements of said first and second members to define at least one alignment set of recesses formed by one of said at least one first recesses and one of said second recesses so that at least one such selected longitudinal alignment set is attained within said predetermined arcuate degree range of said desired arcuate position;

and insert means inserted into said at least one such selected longitudinal alignment set of recesses, said insert means and said first and second recesses of said at least one such selected longitudinal alignment set of recesses having means cooperating to secure said insert means in said at least one such selected longitudinal alignment set of recesses, locking said insert means against radial removal from said at least one such selected longitudinal alignment set of recesses and resisting longitudinal removal of said insert means from said at least one such selected longitudinal alignment set of recesses, said insert means preventing relative arcuate movements of said first member and said second member, said insert means being removable from said at least one such selected longitudinal alignment set of recesses so that said first and second members may be arcuately moved relative to each other.

5. The locking arrangement means of claim 4 in which said insert means has a cross section of substantially the same shape as the cross sections of said recesses.

6. The locking arrangement means of claim 4 in which said insert means is circular in cross section and at least radially fills said radially inner circular portions of said at least one such selected longitudinal alignment set of recesses.

7. The locking arrangement means of claim 4 in which said recess keyhole shaped cross sections each have a parallel-sided quadrangular outer recess portion connecting with said radially inner circular recess portion throughout an arc of said radially inner circular recess portion, said arc subtending a chord which is lesser in length than the diameter of said radially inner circular recess portion.

8. The locking arrangement of claim 7 in which said insert means is resiliently deformable and has a keyhole shaped cross section with a parallel-sided portion connecting with a circular portion to conform with said recess keyhole shaped cross sections.

9. In a fitting having members threaded together to a desired position including a desired arcuate relative position, means for locking said members against relative rotation so as to maintain said members within a predetermined angular range of rotation relative to each other with encompasses said desired position, said locking means comprising:

longitudinally extending recesses having radially extending wall portions formed in the outer surfaces of said fitting members with axially adjacent ones of said recesses being in axial alignment, and an insert which is fitted in a set of said axially aligned recesses in surface-engaged pressing relation to at least portions of said radially extending wall portions of said recesses so that said insert is locked in said set of axially aligned recesses by said surface-engaged pressing relation, said insert thus locking said members against relative rotation.

10. The locking means of claim 9 in which said recesses have matable keyhole shaped cross sections each of which is defined by a quadrangular cross section outer recess portion connecting with a radially inward enlarged circular recess portion, said enlarged circular recess portion having a diameter greater than the minimum cross section width of said quadrangular cross section outer recess portion.

11. The locking means of claim 10 in which said insert is keyhole shaped in cross section and is resiliently deformable so that the enlarged circular portion of said keyhole shaped insert is pushed laterally through said quadrangular cross section outer recess portions and into said radially inward enlarged circular recess portions of said recesses in a laying-down manner until the enlarged circular portion of said keyhole shaped insert is contained within the enlarged circular recess portions of said recesses in which it is fitted.

12. The locking means of claim 9 in which said recesses are laterally smaller in cross section at least one point than the minimum undeformed lateral cross section width of said insert so that said insert must have been deformably forced into said set of recesses when fitted in said set of axially aligned recesses.

13. In a fitting having an externally threaded first member and an internally threaded second member having axially aligned bores therein for receiving a circular member such as a pipe, tube or rod, said second member being joined in axially aligned threaded relation with said first member to a desired arcuate position relative to said first member, said members each having an axially extending part thereof which is diametrically greater than the threads of either of said members, said diametrically greater axially extending parts of said first and second members respectively having first and second axially juxtaposed ends when said members in said desired arcuate position and said second member having another end axially opposite said second axially disposed end; the improvement including:

locking arrangement means for removably locking said first and second members against relative arcuate movements at a relative arcuate position of said members which is within a predetermined arcuate degree range of said desired arcuate position and sealing means for sealing the internal and external threads of said first and second threaded members against physical damage and contamination by foreign material, said locking arrangement means comprising:

at least one longitudinally extending first recess formed in said outer surface of said first threaded member and defined by first radially extending recess walls and a plurality of circumferentially spaced second recesses formed in said outer surface of said second radially extending threaded member and defined by second recess walls, said first and second recesses having in cross section at least portions thereof by which said at least one first recess is selectively longitudinally alignable with at least one of said second recesses in increments of relative arcuate movements of said first and second members to define at least one alignment set of recesses formed by one of said at least one first recesses and one of said second recesses so that at least one such selected longitudinal alignment set is attained within said predetermined arcuate degree range of said desired arcuate position;

and insert means inserted into said at least one such selected longitudinal alignment set of recesses and having outer surface means in surface engagement with at least some of said first and second radially extending recess walls so as to fill at least portions of said first and second recesses, said insert means and said first and second recesses of said at least one such selected longitudinal alignment set of recesses having locking means including said outer surface means and said at least some of said first and second radially extending recess walls in surface engagement therewith, said locking means cooperating to secure said insert means in said at least one such selected longitudinal alignment set of recesses and locking said insert means against radial removal from said at least one such selected longitudinal alignment set of recesses and resisting longitudinal removal of said insert means from said at least one such selected longitudinal alignment set of recesses, said insert means preventing relative arcuate movements of said first member and said second member, said insert means being removable from said at least one such selected longitudinal alignment set of recesses so that said first and second members may be arcuately moved relative to each other;

and said sealing means comprising a reduced diameter portion of said second member forming said second member other end, a first seal in said reduced diameter portion and a second seal in said first member bore adapted to be in sealing relation with the circular member when the circular member is received in said fitting, said first and second seals sealing said axially aligned bores against contamination and said second member other end protecting the internal and the external threads of said members against physical damage and contamination.

14. In a fitting having members threaded together to a desired position including a desired arcuate relative position, means for locking said members against relative rotation so as to maintain said members within a predetermined angular range of rotation relative to each other which encompasses said desired position, said locking means comprising:

a set of at least two longitudinally extending angularly related adjacent surfaces circumferentially joined at an angle less than 180° and defining outer surfaces of each of said fitting members, and insert means fitted to at least adjacent portions of adjacent ones of said sets of angularly related adjacent surfaces in gripping relation so that said insert means lock said sets of angularly related adjacent surfaces of said adjacent fitting members against relative rotation, said adjacent fitting members thus being locked against relative rotation;

said angularly related adjacent surfaces being planar and arranged to form in cross section polygonally arranged outer surfaces, said insert means being a shrink-fitted plastic member circumferentially surrounding said adjacent fitting members at least said adjacent portions of said sets of angularly related adjacent surfaces and gripping said sets of angularly related adjacent surfaces in locking and sealing relation.

15. The locking means of claim 14, said shrink-fitted plastic member extending circumferentially around and longitudinally over the ends of said fitting members and sealing the outer ends of said fitting members against entry of foreign contaminants.

* * * * *